US008913196B2

(12) United States Patent
Hamamura

(10) Patent No.: US 8,913,196 B2
(45) Date of Patent: Dec. 16, 2014

(54) VIDEO PROCESSING DEVICE AND VIDEO PROCESSING METHOD INCLUDING DESERIALIZER

(75) Inventor: Shigeo Hamamura, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 14/345,920

(22) PCT Filed: Sep. 22, 2011

(86) PCT No.: PCT/JP2011/071723

§ 371 (c)(1),
(2), (4) Date: Mar. 19, 2014

(87) PCT Pub. No.: WO2013/042264

PCT Pub. Date: Mar. 28, 2013

(65) Prior Publication Data

US 2014/0226064 A1 Aug. 14, 2014

(51) Int. Cl.
*H04N 9/74* (2006.01)
*H04N 7/08* (2006.01)
*H04N 5/06* (2006.01)

(52) U.S. Cl.
CPC ... *H04N 7/08* (2013.01); *H04N 5/06* (2013.01)
USPC .......................................... 348/720; 348/558

(58) Field of Classification Search
USPC ........ 348/469, 720, 558; 341/60, 61, 99, 100; 370/366, 368, 503, 509, 514, 536, 370/381–383, 542; 375/240, 240.26, 375/240.28
See application file for complete search history.

(56) References Cited

U.S. PATENT DOCUMENTS

| | | | | |
|---|---|---|---|---|
| 6,618,095 B1* | 9/2003 | Takeuchi et al. | ............... | 348/476 |
| 6,690,428 B1* | 2/2004 | Hudelson et al. | ............. | 348/461 |
| 7,792,152 B1* | 9/2010 | Xu et al. | ........................ | 370/503 |
| 2008/0031450 A1* | 2/2008 | Yamashita | ..................... | 380/212 |
| 2011/0173654 A1* | 7/2011 | Todo et al. | ....................... | 725/32 |

FOREIGN PATENT DOCUMENTS

| | | |
|---|---|---|
| JP | 2002-176409 A | 6/2002 |
| JP | 2008-236194 A | 10/2008 |

(Continued)

OTHER PUBLICATIONS

International Search Report (ISR) (PCT Form PCT/ISA/210), in PCT/JP2011/071723, dated Dec. 20, 2011.

*Primary Examiner* — Victor Kostak
(74) *Attorney, Agent, or Firm* — McGinn IP Law Group, PLLC

(57) ABSTRACT

A video processing device includes: a deserializer that both converts a serial digital interface signal received as input to parallel data and extracts a clock; format detection means that both detects a video data format that is included in the parallel data that were converted by the deserializer and supplies clock ratio information that indicates the ratio of the clock frequency and the pixel clock frequency stipulated by the format; pixel clock generation means that generates a pixel clock based on the clock that was extracted by the deserializer; saving means that saves video data and supplies the saved video data in synchronization with the pixel clock; write control means that, based on the clock ratio information, divides the video data that are contained in the parallel data that were converted by the deserializer into two or four portions and saves the divided data in the saving means; and an unpack processor that, synchronized with the pixel clock, subjects the data that are supplied from the saving means to processing that accords with the video format.

5 Claims, 5 Drawing Sheets

(56) References Cited

FOREIGN PATENT DOCUMENTS

| | | |
|---|---|---|
| JP | 2009-296383 A | 12/2009 |
| JP | 2010-093658 A | 4/2010 |
| JP | 2010-199725 A | 9/2010 |
| JP | 2011-061327 A | 3/2011 |

* cited by examiner

Fig.1 PRIOR ART
| | Resolution | Video Format | Parallel Clock | Pixel Clock |
|---|---|---|---|---|
| SD-SDI | 480i | YCbCr 4:2:2 10bit | 27MHz | 13.5MHz |
| | 576i | YCbCr 4:2:2 10bit | 27MHz | 13.5MHz |
| HD-SDI | 1080p24/25/30 | YCbCr 4:2:2 10bit | 148.5MHz | 74.25MHz |
| | 1080i60/50 | YCbCr 4:2:2 10bit | 148.5MHz | 74.25MHz |
| | 720p60/50 | YCbCr 4:2:2 10bit | 148.5MHz | 74.25MHz |
| 3G-SDI | 1080p24/25/30 | RGB/YCbCr 4:4:4 12/10bit | 297MHz | 74.25MHz |
| | 1080i60/50 | RGB/YCbCr 4:4:4 12/10bit | 297MHz | 74.25MHz |
| | 1080p60/50 | YCbCr 4:2:2 10bit | 297MHz | 148.5MHz |
Fig.2 PRIOR ART
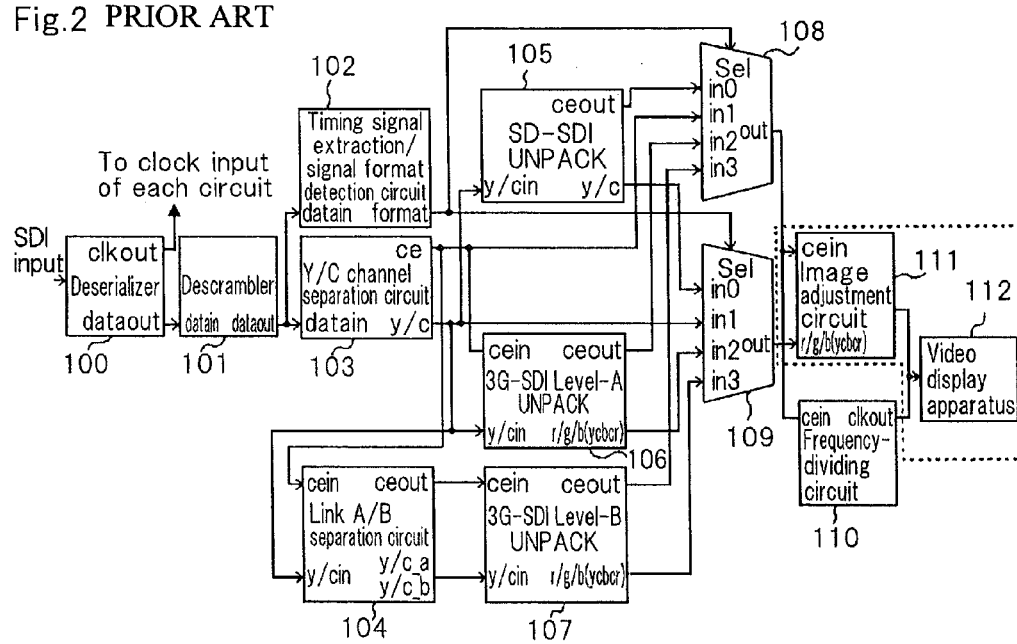
Fig.3 PRIOR ART
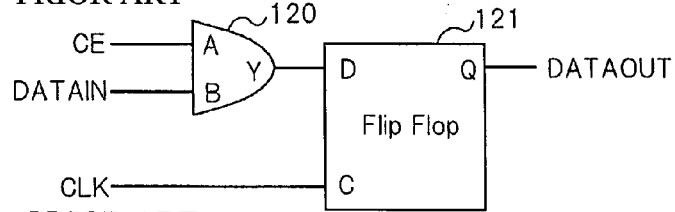
Fig.4 PRIOR ART
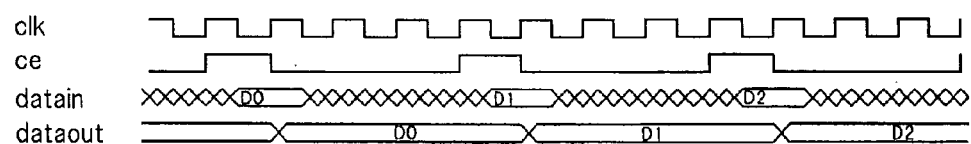

VIDEO PROCESSING DEVICE AND VIDEO PROCESSING METHOD INCLUDING DESERIALIZER

TECHNICAL FIELD

The present invention relates to a video processing device that processes SDI (Serial Digital Interface) video signals that are one video signal transmission standard.

BACKGROUND ART

SD (Standard Definition)-SDI and HD (High Definition)-SDI are known as SDI standards. A signal transmission standard known as 3G-SDI having twice the transmission speed as HD-SDI has also been recently introduced.

As shown in FIG. 1, the SD-SDI and HD-SDI standards deal with YCbCr 10-bit parallel data, and the frequency of the parallel clock for achieving synchronization of parallel data is 27 MHz for SD-SDI and 148.5 MHz for HD-SDI. The frequency of the pixel clock (sampling rate) is 13.5 MHz for SD-SDI and 74.25 MHz for HD-SDI.

On the other hand, the 3G-SDI standard deals with 10-bit or 12-bit RGB or YCbCr parallel data, the frequency of the clock (transmission clock) for achieving synchronization of the parallel data is 297 MHz, and the frequency of the pixel clock is 74.25 MHz or 148.5 MHz.

As can be understood from the foregoing explanation, the video format and color mapping based on the 3G-SDI standard differs from its counterparts that are based on the SD-SDI or HD-SDI standards. In addition, the frequencies of the parallel clocks of each of SD-SDI, HD-SDI, and 3G-SDI also differ. As a result, in order to process data of the each of the SD-SDI, HD-SDI, and 3G-SDI standards, a video processing device that processes SDI signals must implement both conversion to multiple rates as well as processing that corresponds to the formats (video formats and color mapping) of each of the standards.

FIG. 2 shows the configuration of a video apparatus that is equipped with a multi-rate video processing device that corresponds to each of the SD-SDI, HD-SDI, and 3G-SDI standards.

Referring to FIG. 2, the video processing device includes: deserializer 100, descrambler 101, timing signal extraction/signal format detection circuit 102, Y/C channel separation circuit 103, link separation circuit 104, UNPACK circuits 105-107, selectors 108 and 109, and frequency-dividing circuit 110. A video apparatus is realized by adding image adjustment circuit 111 and video display apparatus 112 to this video processing device.

Deserializer 100 includes an SDI input terminal, a clock output terminal, and a data output terminal.

SDI signals of any of the SD-SDI, HD-SDI, and 3G-SDI standards that are supplied from an SDI-compatible outside transmission device are supplied to the SDI input terminal of deserializer 100.

The outside transmission device is here briefly described.

The outside transmission device includes a signal processor, a serializer, and a transmission unit.

The signal processor takes as input each data item that includes video data or supplementary data (such as audio data), a parallel clock, and a timing signal, implements various processes such as scrambling input data, inserting a timing signal, or pack processing, and based on the parallel clock, generates parallel data based on the data that follows this processing. The signal processor supplies parallel data and a parallel clock to the serializer.

The serializer generates a serial clock based on the parallel clock that was received as input, and based on this generated serial clock, converts parallel data received as input to serial data.

The transmission unit supplies the serial data (SDI signals) that are supplied from the serializer by way of coaxial cable to the SDI input terminal of deserializer 100.

Scrambled NRZI (Non Return to Zero Inverted) is typically used as the coding to accurately transmit information of clocks. NRZI coding is a coding scheme that continues the signal level when "0" is transmitted and inverts the immediately preceding signal level when "1" is transmitted.

Referring again to FIG. 2, deserializer 100 converts SDI signals that are applied as input to the SDI input terminal to 10-bit parallel data, and supplies this parallel data from the data output terminal. Deserializer 100 further extracts information of the parallel clock and supplies the extracted parallel clock from the clock output terminal.

Although not shown in FIG. 2, the clock that is supplied from the clock output terminal is supplied to each of timing signal extraction/signal format detection circuit 102, Y/C channel separation circuit 103; link separation circuit 104, UNPACK circuits 105-107, frequency-dividing circuit 110, and image adjustment circuit 111; and each circuit operates based on the supplied clock.

Descrambler 101 has a data input terminal and a data output terminal. The parallel signal that is supplied from the data output terminal of deserializer 100 is supplied to the data input terminal of descrambler 101.

Descrambler 101 restores parallel data that are applied as input to the data input terminal to the original data. Here, this original data is the parallel data that precedes the scrambled NRZI process in the above-described outside transmission device. Descrambler 101 supplies this restored data from the data output terminal.

Timing signal extraction/signal format detection circuit 102 has a data input terminal and a format output terminal. Y/C channel separation circuit 103 has a data input terminal, a Y/C output terminal, and a CE output terminal.

Restored data that are supplied from the data output terminal of descrambler 101 are supplied to the data input terminals of each of timing signal extraction/signal format detection circuit 102 and Y/C channel separation circuit 103.

Timing signal extraction/signal format detection circuit 102 both extracts a timing signal from the restored data that are applied as input to the data input terminal and specifies the starting positions of frames of the restored data based on the result of extraction of the timing signal Timing signal extraction/signal format detection circuit 102 then refers to the starting positions of the frames that were specified to detect the signal format (the format that conforms to the SDI standard) of the restored data and supplies the detection result from the format output terminal.

Y/C channel separation circuit 103 separates the restored data that are received as input into a 10-bit Y-channel and a 10-bit C-channel.

When the restored data input is SD-SDI, Y/C channel separation circuit 103 supplies the Y-channel signal and the C-channel signal to the Y/C input terminal of SD-SDI UNPACK circuit 105.

When the restored data input is HD-SDI, Y/C channel separation circuit 103 supplies the Y-channel signal and C-channel signal to the input terminal IN1 of selector 109.

Due to the difference in multiplex methods in the 3G-SDI standard, there are two mapping schemes, level A and level B. Level A and level B can be distinguished by this difference in mapping.

When the restored data input is data of level A of 3G-SDI, Y/C channel separation circuit 103 supplies the Y-channel signal and C-channel signal to UNPACK circuit 106. When the restored data input is data of level B of 3G-SDI, Y/C channel separation circuit 103 supplies the Y-channel signal and C-channel signal to link separation circuit 104.

In addition, Y/C channel separation circuit 103 synchronizes with the clock signal from deserializer 100 to supply a Clock Enable from CE output terminal. Clock Enable causes processing in each circuit to be executed at a period that matches the video data and has a frequency of one-half that of the input clock signal. Clock Enable is supplied to each of input terminal in1 of selector 108, terminal CEin of link separation circuit 104, and terminal CEin of UNPACK circuit 106.

UNPACK circuit 106 carries out a process of unpacking the Y-channel signal and C-channel signal of the level-A mapping to acquire a video signal. The video signal is supplied to input terminal In2 of selector 109 from the data output terminal of UNPACK circuit 106. UNPACK circuit 106 further supplies the Clock Enable that was supplied from terminal CEin from terminal CEout. The Clock Enable that is supplied from terminal CEout is supplied to input terminal In2 of selector 108.

Link separation circuit 104 separates each of the Y-channel signal and C-channel signal of level-B mapping into link A that uses odd-numbered channels and link B that uses even-numbered channels. The data of link-A channels and the data of link-B channels are supplied to Y/C input terminal of UNPACK circuit 107.

Link separation circuit 104 further supplies the Clock Enable that was supplied to terminal CEin from terminal CEout. The Clock Enable that is supplied from terminal CEout is supplied to terminal CEin of UNPACK circuit 107.

UNPACK circuit 107 unpacks the link-A channel data and link-B channel data that are supplied to the Y/C input terminal to acquire video signals.

The video signals are supplied from the data output terminal of UNPACK circuit 107 to input terminal In3 of selector 109. UNPACK circuit 107 further supplies the Clock Enable that was supplied to terminal CEin from terminal CEout. The Clock Enable that is supplied from terminal CEout is supplied to input terminal In3 of selector 108.

In accordance with the format detection results from timing signal extraction/signal format detection circuit 102, selector 108 selects one of input terminals in0-In3 to which the Clock Enable is supplied and supplies the Clock Enable that was supplied to the selected input terminal from the output terminal. More specifically, input terminal In0 is selected when the format detection result is SD-SDI; input terminal In1 is selected when the format detection result is HD-SDI, and input terminal In2 is selected when the format detection result is level A of 3G-SDI. Input terminal In3 is selected when the format detection result is level B of 3G-SDI.

The Clock Enable that was supplied from selector 108 is supplied to frequency-dividing circuit 110 and image adjustment circuit 111.

In accordance with the format detection result from timing signal extraction/signal format detection circuit 102, selector 109 selects one input terminal from among input terminals In0-In3 to which video signals are supplied and supplies the video signal that is supplied to the selected input terminal from the output terminal. More specifically, Input terminal In0 is selected when the format detection result is SD-SDI; input terminal In1 is selected when the format detection result is HD-SDI, input terminal In2 is selected when the format detection result is level A of 3G-SDI, and input terminal In3 is selected when the format detection result is level B of 3G-SDI.

The video signal that is supplied from selector 109 is supplied to image adjustment circuit 111.

Image adjustment circuit 111 subjects the input video signal to processes that are necessary for video display on video display apparatus 112, such as an enlargement or reduction process or a gamma correction process.

Based on the Clock Enable input, frequency-dividing circuit 110 generates a pixel clock that is necessary for video display by video display apparatus 112.

As shown in FIG. 1, the clock frequencies in each of SD-SDI, HD-SDI, and 3G-SDI are different, and moreover, the ratios of clock frequency and pixel clock frequency differ between levels A and B for 3G-SDI.

In the video processing device described hereinabove, Y/C channel separation circuit 103 generates Clock Enable to process video data in which the ratios of clock frequency and pixel clock frequency differ. Based on this Clock Enable, the processing of video data is carried out in each of link separation circuit 104, UNPACK circuits 106 and 107, and image adjustment circuit 111.

When supplying video data to video display apparatus 112, frequency-dividing circuit 110 generates a pixel clock from the Clock Enable. The video data are supplied to video display apparatus 112 together with the pixel clock that was generated in frequency-dividing circuit 110.

The Clock Enable is not supplied to UNPACK circuit 105. UNPACK circuit 105 both carries out processing of video data based on the clock signal from deserializer 100 and supplies the input clock signal as is as the Clock Enable.

FIG. 3 shows a data output circuit that synchronizes with the Clock Enable and supplies data as output. This data output circuit is used in link separation circuit 104, UNPACK circuits 106 and 107, and image adjustment circuit 111.

The data output circuit shown in FIG. 3 includes AND circuit 120 and flip-flop 121. AND circuit 120 is a component that obtains output Y from two inputs A and B, is supplied with Clock Enable as input A, and is supplied with data as input B. Output Y is a value that takes the logical product of inputs A and B.

Flip-flop 121 includes data input terminal D, clock input terminal C, and data output terminal Q. Flip-flop 121 operates based on the clock that is supplied to clock input terminal C and temporarily saves data that is supplied to data input terminal D. Output Y of AND circuit 120 is supplied to data input terminal D of flip-flop 121.

FIG. 4 is a timing chart showing the operation of the data output circuit shown in FIG. 3.

As shown in FIG. 4, video data are supplied to data input terminal D of flip-flop 121 at the intervals of the active state of the Clock Enable. Flip-flop 121 supplies video data synchronized with the Clock Enable.

By means of a configuration in which the circuit shown in FIG. 3 is applied to each of link separation circuit 104, UNPACK circuits 106 and 107, and image adjustment circuit 111, the same Clock Enable is used in each circuit, and synchronization of each of the circuits can therefore be easily established.

However, when attempting to configure the 3G-SDI processing circuits (link separation circuit 104 and UNPACK circuits 106 and 107) that process 3G-SDI signals by FPGA (Field-Programmable Gate Arrays) in the above-described configuration, high-speed FPGA must be used to maintain timing performance.

To describe this in more concrete terms, a 3G-SDI processing circuit includes two flip-flops 131 and 132 and combinational circuit 133 such as shown in the upper portion of FIG. 5.

Each of flip-flops 131 and 132 includes clock input terminal C to which a clock is applied as input, data input terminal D to which data are applied as input, and data output terminal Q from which data are supplied as output. The data output terminal Q of flip-flop 131 is connected to the data output terminal Q of flip-flop 132 by way of combinational circuit 133.

In the above-described 3G-SDI processing circuit, a clock of 297 MHz is supplied to the clock input terminals C of each of flip-flops 131 and 132, and combinational circuit 133 operates at a clock of 297 MHz. When a circuit that operates at a high frequency of 297 MHz is made up of FPGA, the processing speed of the FPAG must be determined while taking into consideration the delay produced by the wiring in combinational circuit 133.

The price of FPGA is dependent upon the processing speed, the price increasing with the processing speed. In addition, the processing speed of the FPGA must be increased to the extent of the delay produced by the wiring in combinational circuit 133. Constituting a circuit that operates at a high frequency of 297 MHz by FPGA necessitates the use of FPGA with a high processing speed, and the cost of the device therefore increases.

In response to this problem, pipelining is implemented that improves the timing performance by dividing the processing of combinational circuit 133 between flip-flops 131 and 132 into a plurality of processes and by reducing the delay of one combinational circuit.

The lower portion of FIG. 5 shows an example of a pipeline configuration. The pipeline configuration includes three flip-flops 131, 132, and 134 and combinational circuits 133a and 133b.

Each of flip-flops 131, 132, and 134 includes clock input terminal C to which a clock is applied as input, data input terminal D to which data are applied as input, and data output terminal Q from which data are supplied as output.

Data output terminal Q of flip-flop 131 is connected to data output terminal Q of flip-flop 134 by way of combinational circuit 133a. Data output terminal Q of flip-flop 134 is connected to data output terminal Q of flip-flop 132 by way of combinational circuit 133b.

By means of the above-described pipeline configuration, the processing of combinational circuit 133 is divided into two portions, one portion of processing being executed by combinational circuit 133a and the other portion of processing being executed by combinational circuit 133b. Because the amount of delay produced in the wiring for each of combinational circuits 133a and 133b is less than the amount of delay produced in the wiring for combinational circuit 133 described hereinabove, FPGA of lower processing speed can be used, with the result that the cost of the device can be reduced.

In addition, in the video processing device shown in FIG. 2, a plurality of circuits (link separation circuit 104 and UNPACK circuits 106 and 107) is connected to the output line of the Clock Enable of Y/C channel separation circuit 103. The load upon the Clock Enable output line therefore increases (increased FANOUT), with the result that the amount of delay produced in the output line increases.

Accordingly, when 3G-SDI processing circuits are constituted by FPGA, the increase of FANOUT for the output line of the Clock Enable of Y/C channel separation circuit 103 must also be taken into consideration in addition to the delay produced in the wiring for combinational circuit 133 shown in FIG. 3. FPGA having high processing speed must therefore be used, resulting in an increase in the cost of the device.

In response to this problem, methods have been proposed for reducing an increase in FANOUT. A method of suppressing increase in FANOUT is described hereinbelow.

In a circuit in which four circuits 141-144 are connected in parallel to the Clock Enable output line as shown in FIG. 6, FANOUT for the output line increases, with the result that the amount of delay produced in the output line increases. A circuit such as shown in FIG. 7 is used to reduce a increase of FANOUT.

The circuit shown in FIG. 7 includes four circuits 141-144 and two flip-flops 145 and 146.

Each of flip-flops 145 and 146 includes clock input terminal C to which a clock is applied as input, input terminal D to which the Clock Enable is applied as input, and output terminal Q from which the Clock Enable is supplied as output.

Circuits 141 and 142 are connected in parallel to output terminal Q of flip-flop 145. Circuits 143 and 144 are connected in parallel to output terminal Q of flip-flop 146.

By means of the circuits shown in FIG. 7, the FANOUT for the Clock Enable output lines from output terminals Q of each of flip-flops 145 and 146 is less than in the circuit shown in FIG. 6. Accordingly, FPGA having a slower processing speed can be used to enable a reduction of the cost of the device.

A technique is described in Patent Document 1 for processing a transmission stream described by level A of 3G-SDI. A process relating to link A and link B HD-SDI is described in Patent Document 2.

RELATED ART LITERATURE

Patent Documents

Patent Document 1: Japanese Unexamined Patent Application Publication No. 2009-296383
Patent Document 2: Japanese Unexamined Patent Application Publication No. 2010-93658

DISCLOSURE OF THE INVENTION

When 3G-SDI processing circuits (link separation circuit 104 and UNPACK circuits 106 and 107) that process 3G-SDI signals are made up of FPGA in the video processing device shown in FIG. 2, FPGA having high processing speed and high cost must be used due to the considerations of the influence of the delay of the wiring in the combinational circuits and the influence of the delay resulting from the increase of FANOUT for the Clock Enable signal line, raising the problem of increase of the cost of the device.

The problem of the influence of delay of the wiring in the combinational circuits can be resolved by applying the pipeline configuration shown in the lower portion of FIG. 5. In this case, however, a plurality of circuits must be added for pipelining, resulting in an increase in the cost of the device.

The problem of the influence of the delay resulting from increase in FANOUT for the Clock Enable signal line can be resolved by applying the circuit shown in FIG. 7. In this case, however, a plurality of flip-flops must be added, resulting in an increase in the cost of the device.

It is therefore an object of the present invention to provide a video processing device and video processing method that enable the processing of SDI signals that use the different transmission standards, such as SD-SDI, HD-SDI, and 3G-SDI, and that can achieve lower cost.

The video processing device of the present invention for achieving the above-described object is a video processing device that takes as input any of a plurality of serial digital interface signals that each contain signals in which parallel data that contain at least video data have been converted to serial data and information of a clock for synchronizing the parallel data and in which the video format of the video data and a frequency of the clock each mutually differ, the video processing device including:

a deserializer that both converts serial digital interface signals that are received as input to the parallel data and extracts the clock;

format detection means that both detects the video format of the video data that are contained in the parallel data that have been converted by the deserializer and supplies as output clock ratio information that indicates a ratio between a clock frequency and a pixel clock frequency stipulated by the video format that was detected;

pixel clock generation means that, based on the clock that was extracted by the deserializer, generates a pixel clock having the frequency stipulated by the video format that was detected by the format detection means and supplies the generated pixel clock;

saving means that saves the video data that are contained in the parallel data that were converted by the deserializer and that supplies as output the saved video data in synchronization with the pixel clock that was supplied from the pixel clock generation means;

write control means that, based on the clock ratio information that was supplied from the format detection means, divides into two or four portions the video data that are contained in the parallel data that were converted by the deserializer and saves the divided video data in the saving means; and a processor that, synchronized with the pixel clock that was supplied from the pixel clock generation means, subjects data that were supplied from the saving means to processing according to the video format that was detected by the format detection means.

The video processing method of the present invention includes:

taking as input any of a plurality of serial digital interface signals that each contain a signal in which parallel data that contain at least video data are converted to serial data and information of a clock for synchronizing the parallel data and for which the video format of the video data and a frequency of the clock mutually differ, and both converting the serial digital interface signals that was received as input to the parallel data and extracting the clock;

both detecting the video format of the video data that are contained in the parallel data that were converted and generating clock ratio information that indicates a ratio between a clock frequency and a pixel clock frequency stipulated by the video format that was detected;

based on the clock that was extracted, generating a pixel clock having the frequency that was stipulated by the video format that was detected;

based on the clock ratio information, dividing into two or four portions the video data that were contained in the parallel data that were converted and saving the divided video data in memory, and then supplying as output the video data that were saved in memory synchronized with the pixel clock; and synchronized with the pixel clock, subjecting data that were supplied from the memory to processing that accords with the video format that was detected.

BRIEF DESCRIPTION OF THE DRAWINGS

FIG. 2 is a block diagram showing an example of a video processing device.

FIG. 3 is a block diagram showing an example of the data output circuit that is applied in the video processing device shown in FIG. 2.

FIG. 4 is a timing chart for describing the operations of the data output circuit shown in FIG. 3.

FIG. 11 is a timing chart for describing still other data-writing operations that are carried out in the video processing device shown in FIG. 8.

FIG. 12 is a timing chart for describing SD-SDI data-writing operations that are carried out in the video processing device shown in FIG. 8.

FIG. 13 is a timing chart for describing HD-SDI data-writing operations that are carried out in the video processing device shown in FIG. 8.

EXPLANATION OF REFERENCE NUMBERS

Figure 5:
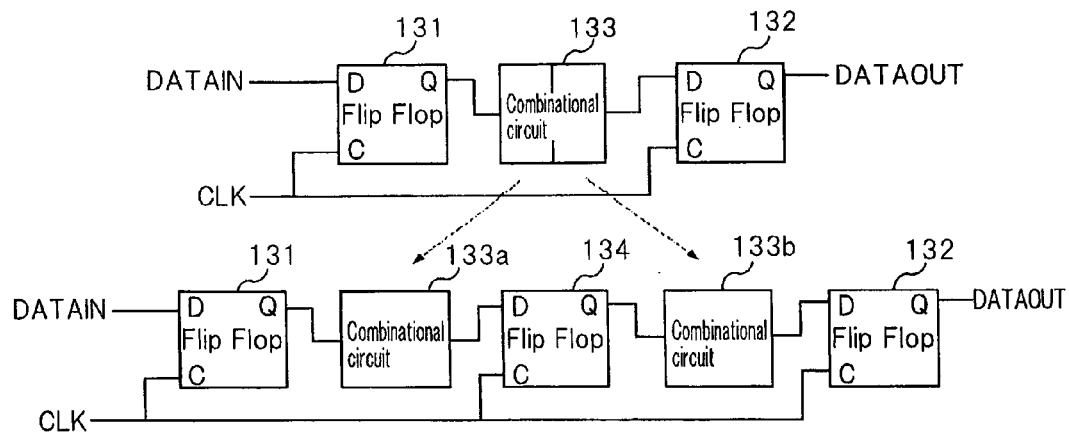
FIG. 5 is a block diagram showing the configuration of a circuit that is applied in the 3G-SDI processing circuit of the video processing device shown in FIG. 2.
Figure 6:
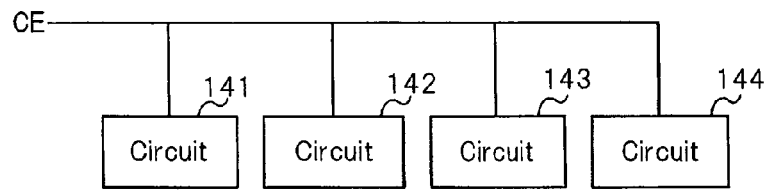
FIG. 6 is a block diagram showing the configuration of another circuit that is applied in the 3G-SDI processing circuit of the video processing device shown in FIG. 2.

10 deserializer
11 descrambler
12 timing signal extraction/signal format detection circuit
13 write control circuit
14 frequency-dividing circuit
15-18 FIFO memory
19 UNPACK processing circuit
20 image adjustment circuit
21 video display apparatus

MODE FOR CARRYING OUT THE INVENTION

An exemplary embodiment of the present invention is next described with reference to the accompanying drawings.

Figure 8:
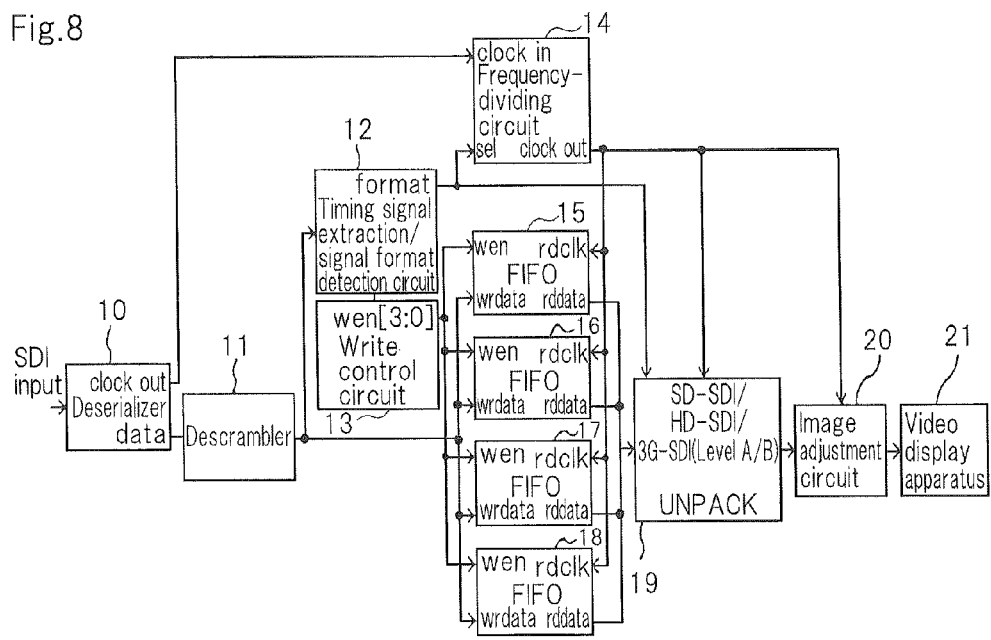
FIG. 8 is a block diagram showing the configuration of a video display device that is equipped with the video processing device that is an exemplary embodiment of the present invention.

FIG. 8 is a block diagram showing the configuration of a video display device that is equipped with the video processing device that is an exemplary embodiment of the present invention.

Referring to FIG. 8, the video processing device is capable of multi-rate processing compatible with each of the SD-SDI, HD-SDI, and 3G-SDI standards and includes: deserializer 10, descrambler 11, timing signal extraction/signal format detection circuit 12, write control circuit 13, frequency-dividing circuit 14, FIFO memories 15-18, and UNPACK processing circuit 19. A video display device is a device in which image adjustment circuit 20 and video display apparatus 21 have been added to this video processing device.

In FIG. 8, deserializer 10 and descrambler 11 are the same as deserializer 100 and descrambler 101 shown in FIG. 2. Image adjustment circuit 20 and video display apparatus 21 are the same as image adjustment circuit 111 and video display apparatus 112 shown in FIG. 2.

Timing signal extraction/signal format detection circuit 12 includes a data input terminal and a format output terminal.

Each of FIFO memories 15-18 includes an Enable input terminal to which a Write Enable is supplied, a data input terminal for writing data, a clock input terminal to which a clock for data reading is applied as input, and a data output terminal for data reading.

Restored data that are supplied from descrambler 11 are supplied to each of the data input terminal of timing signal extraction/signal format detection circuit 12 and the data input terminals of FIFO memories 15-18.

Timing signal extraction/signal format detection circuit 12 both extracts a timing signal from the restored data that have been applied as input to the data input terminal and, based on the extraction result of the timing signal, specifies the starting position of frames of restored data. Timing signal extraction/signal format detection circuit 12 then refers to the specified starting positions of the frames to detect the signal format (the format that conforms to the SDI standard) of the restored data and supplies the detection result to each of frequency-dividing circuit 14 and UNPACK processing circuit 19.

Timing signal extraction/signal format detection circuit 12 further supplies clock ratio information that indicates the frequency ratio of the input clock and the pixel clock of the signal format to write control circuit 13.

Based on the clock ratio information (the frequency ratio of the input clock and the pixel clock of the signal format) that was supplied from timing signal extraction/signal format detection circuit 12, write control circuit 13 supplies a Write Enable for controlling writing of data to FIFO memories 15-18.

Frequency-dividing circuit 14 is a pixel clock generation means that generates a pixel clock for each signal format and includes a clock input terminal, a clock output terminal, and a selection input terminal. The clock that is supplied from deserializer 10 is supplied to the clock input terminal of frequency-dividing circuit 14. The detection result of the signal format that is supplied from timing signal extraction/signal format detection circuit 12 is supplied to the selection input terminal of frequency-dividing circuit 14. According to the detection result of the signal format, frequency-dividing circuit 14 generates a pixel clock based on the clock that is supplied from deserializer 10 and supplies the pixel clock that was generated to clock output terminal.

Figure 9:
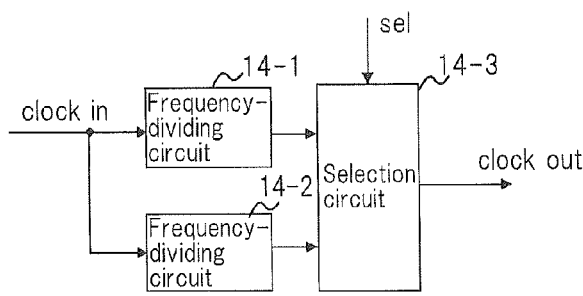
FIG. 9 is a block diagram showing an example of the frequency-dividing circuit of the video processing device shown in FIG. 8.

FIG. 9 shows the configuration of frequency-dividing circuit 14. As shown in FIG. 9, frequency-dividing circuit 14 includes frequency-dividing units 14-1 and 14-2 and selection circuit 14-3.

Selection circuit 14-3 includes first and second clock input terminals, a selection input terminal to which the detection result of the signal format that is supplied from timing signal extraction/signal format detection circuit 12 is applied as input, and a clock output terminal.

The clock that is supplied as output from deserializer 10 is supplied to the input terminals of each of frequency-dividing units 14-1 and 14-2.

Frequency-dividing unit 14-1 supplies a clock having one-half the frequency of the input clock. The output clock of frequency-dividing unit 14-1 is supplied to the first input terminal of selection circuit 14-3.

Frequency-dividing unit 14-2 supplies a clock having one-quarter the frequency of the input clock. The output clock of frequency-dividing unit 14-2 is supplied to the second input terminal of selection circuit 14-3.

According to the detection result of the signal format that is supplied to its selection input terminal, selection circuit 14-3 selects and supplies as output one clock from among the clocks that are supplied to the first and second clock input terminals.

More specifically, when the signal format is the SD-SDI format, the HD-SDI format, or the format of level A of 3G-SDI, selection circuit 14-3 supplies the clock that is supplied to the first clock input terminal. When the signal format is the format of level B of 3G-SDI, selection circuit 14-3 supplies the clock that is supplied to the second clock input terminal.

The pixel clock generation means may be configured using a PLL (Phase-Locked Loop) circuit in place of frequency-dividing circuit 14. In this case, each of frequency-dividing units 14-1 and 14-2 in the circuit shown in FIG. 9 is replaced by first and second PLL circuits, respectively. The first PLL circuit supplies a clock having a frequency of one-half that of the input clock. The second PLL circuit supplies a clock having a frequency of one-quarter that of the input clock.

The pixel clock that is supplied from frequency-dividing circuit 14 is supplied to each clock input terminal of FIFO memories 15-18, UNPACK processing circuit 19, and image adjustment circuit 20.

In each of FIFO memories 15-18, data writing is carried out in accordance with Write Enable from write control circuit 13 and saved data are supplied from data output terminals in synchronization with the pixel clock from frequency-dividing circuit 14. Each of the data output terminals of FIFO memories 15-18 is connected to the data input terminal of UNPACK processing circuit 19.

UNPACK processing circuit 19 both operates in synchronization with the pixel clock from frequency-dividing circuit 14 and subjects data that are supplied from the data input terminal to an unpacking process in accordance with the detection result of the signal format from timing signal extraction/signal format detection circuit 12 to acquire video signals.

More specifically, UNPACK processing circuit 19 includes a selection circuit, an SD-SDI UNPACK processing circuit, an HD-SDI UNPACK processing circuit, and a 3G-SDI UNPACK processing circuit. The selection circuit has an input terminal to which the output data of FIFO memories 15-18 are supplied and first to third output terminals, the input data that are supplied to the input terminal being supplied from one of the first to third output terminals according to the detection result of the signal format from timing signal extraction/signal format detection circuit 12.

When the signal format is SD-SDI, data are supplied from the first output terminal. The data that are supplied from the first output terminal are supplied to the SD-SDI UNPACK processing circuit.

In the case of SD-SDI, video data are handled in which Y (luminance signal) and C (color-difference signal) data (a two-clock portion) are packed per one pixel. The SD-SDI UNPACK processing circuit carries out the process of unpacking the video data from the first output terminal in synchronization with the pixel clock (13.5 MHz).

When the signal format is HD-SDI, data are supplied from the second output terminal. The data that are supplied from the second output terminal are supplied to the HD-SDI UNPACK processing circuit.

In the case of HD-SDI as well, video data are handled in which Y (luminance signal) and C (color difference signal) data (two-clock portion) are packed per one pixel. The HD-SDI UNPACK processing circuit carries out the process of unpacking the video data from the second output terminal in synchronization with the pixel clock (74.25 MHz).

When the signal format is 3G-SDI, data are supplied from the third output terminal. The data that are supplied from the third output terminal are supplied to the 3G-SDI UNPACK processing circuit.

In the case of 3G-SDI, video data are handled in which Y (luminance signal) and C (color difference signal) data (two-clock portion) are packed per one pixel, or in which a total of a four-clock portion of data that include each item of RGB data and supplementary data are packed per one pixel. In the former case, the 3G-SDI UNPACK processing circuit subjects video data from the third output terminal to an unpacking process in synchronization with the pixel clock (74.25 MHz). In the latter case, however, the 3G-SDI UNPACK processing circuit subjects the video data from the third output terminal to an unpacking process in synchronization with the pixel clock (148.5 MHz).

The SD-SDI UNPACK processing circuit, the HD-SDI UNPACK processing circuit, and the 3G-SDI UNPACK processing circuit each carry out the unpacking process in synchronization with the pixel clock from frequency-dividing circuit 14.

The video signal supplied from UNPACK processing circuit 19 is supplied to image adjustment circuit 20.

A more specific description of the operation of the video processing device of the present exemplary embodiment is next presented.

According to the clock ratio information that is the ratio of the input clock and the pixel clock of the signal format, write control circuit 13 carries out control of either first divided write control in which divided writing of data is carried out using FIFO memories 15 and 16 or second divided write control in which divided writing of data is carried out using FIFO memories 15-18.

The first divided write control is first described.

Figure 10:
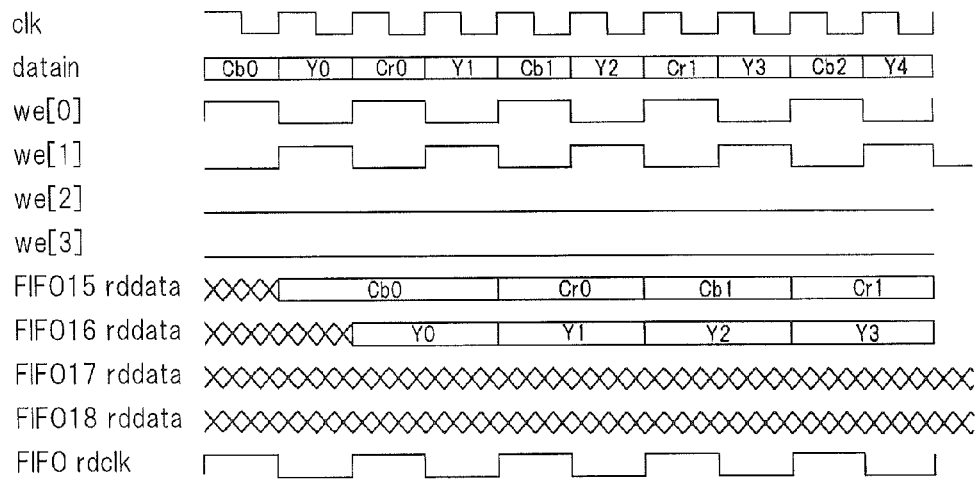
FIG. 10 is a timing chart for describing other data-writing operations that are carried out in the video processing device shown in FIG. 8.
Figure 1:
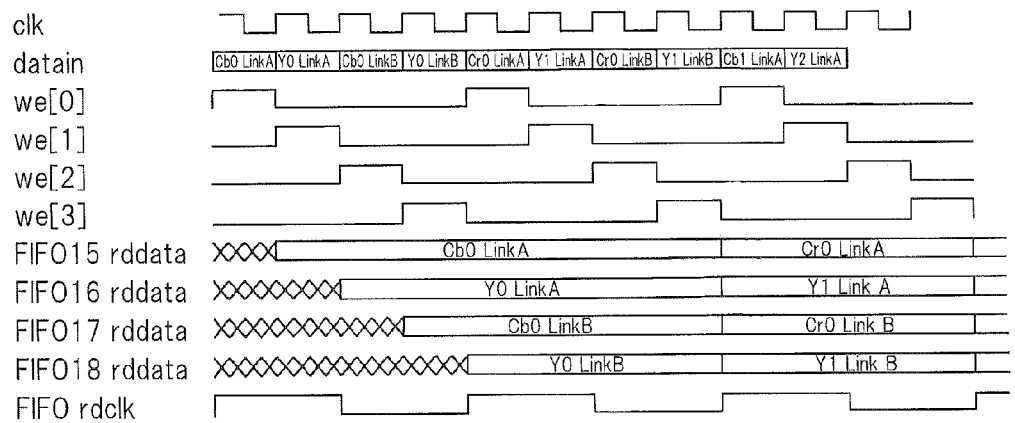
FIG. 1 shows details of each of the standards of SD-SDI, HD-SDI, and 3G-SDI.
Figure 1:
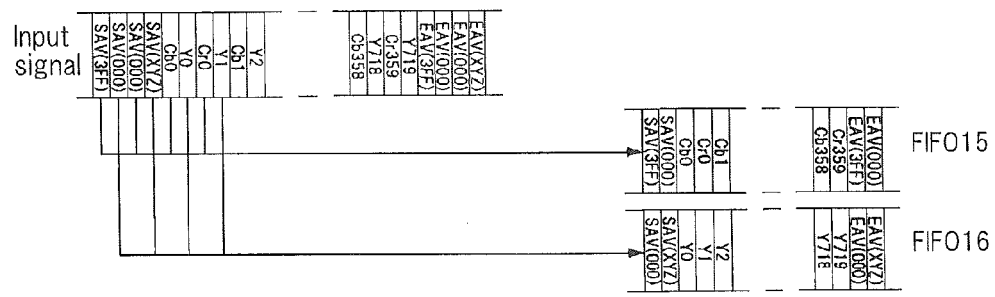
Figure 1:
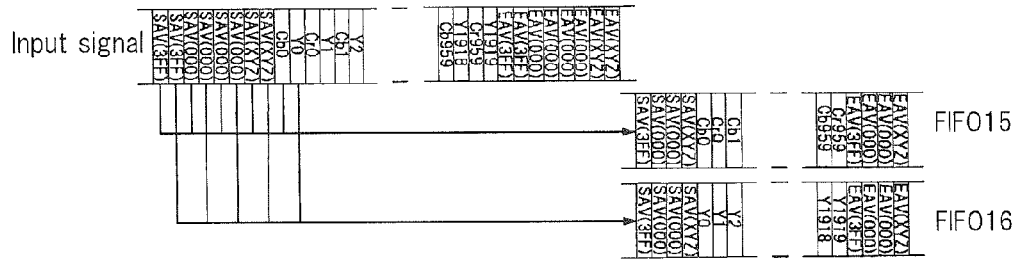

FIG. 10 is a timing chart showing the operations of writing data to and reading data from FIFO memories 15 and 16 by means of the first divided write control. In this example, the clock frequency ratio of the input clock and the pixel clock of the signal format is assumed to be 1:2. As the write data (restored data that are supplied from descrambler 11), Cb0, Y0, Cr0, Y1, Cb1, Y2, Cr1, Y3, . . . are supplied in that order in synchronization with the input clock of the signal format.

Write control circuit 13 alternately places the Write Enable to FIFO memories 15 and 16 in an active state for each fixed time interval and places the Write Enable to FIFO memories 17 and 18 in an inactive state. The fixed time interval is the same as the time of one period of the input clock of the signal format.

In each of FIFO memories 15 and 16, data that have been supplied are written in the interval in which the Write Enable is in the active state. Cb0, Cb1, Cb1, . . . are written in FIFO memory 15, and Y0, Y1, Y2, . . . are written in FIFO memory 16. The write data are thus alternately distributed between FIFO memories 15 and 16.

In each of FIFO memories 15 and 16, a pixel clock having a period of twice that of the input clock of the signal format is supplied as the data read clock, and data that are saved are read in order in accordance with this clock.

FIG. 11 is a timing chart showing the operations of writing data to and reading data from FIFO memories 15-18 in accordance with the second divided write control. In this example, the frequency ratio of the input clock and the pixel clock of the signal format is assumed to be 1:4. In addition, as the write data (restored data that are supplied from descrambler 11), Cb0 (link A), Y0 (link A), Cb0 (link B), Y0 (link B), Cr0 (link A), Y1 (link A), Cr0 (link B), Y1 (link B), are supplied in that order in synchronization with the input clock of the signal format.

Write control circuit 13 alternately places the Write Enable to FIFO memories 15-18 in the active state in order for each fixed time interval. The fixed time interval is the same as the time of one period of the input clock of the signal format.

In each of FIFO memories 15-18, data that have been supplied are written in the interval in which the Write Enable is in the active state. Cb0, Cb1, . . . relating to link A are written to FIFO memory 15. Y0, Y1, . . . relating to link A are written in FIFO memory 16. Cb0, Cb1, . . . relating to link B are written in FIFO memory 17. Y0, Y1, . . . relating to link B are written in FIFO memory 18. The write data are thus distributed among FIFO memories 15-18.

In each of FIFO memories 15-18, a pixel clock having a period of four times the input clock of the signal format is supplied as the data read clock, and saved data are read in order in accordance with this clock.

FIG. 12 shows the state of divided writing in the case of SD-SDI. In FIG. 12, SAV indicates the start position of video data, and EAV shows the end position of video data.

As shown in FIG. 12, in the case of SD-SDI, Y and Cb or Cr are applied alternately, and the Y signal is therefore written in one of FIFO memories 15 and 16, and the Cb or Cr signal is written in the other FIFO memories. SAV and EAV are both timing signals.

FIG. 13 shows the state of divided write control in the case of HD-SDI. In FIG. 13, SAV indicates the start position of video data, and EAV indicates the end position of video data.

In HD-SDI, the pixel clock is the same in all signal formats, and the Y signal is therefore written in one of FIFO memories 15 and 16 and the Cb or Cr signal is written in the other FIFO memories, as with the case of SD-SDI.

Figure 14:
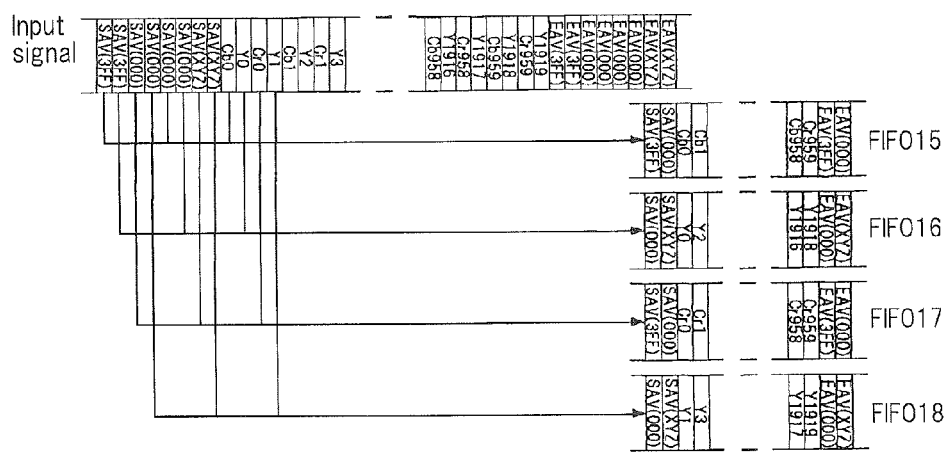
FIG. 14 is a timing chart for describing 3G-SDI data-writing operations that are carried out in the video processing device shown in FIG. 8.

FIG. 14 shows the state of divided write control for the case of level A of 3G-SDI. In FIG. 14, SAV indicates the start position of video data, and EAV indicates the end position of video data. This is an example of divided writing of 12- (or 10-) bit signals in which the level-A signal format of 3G-SDI is RGB (or YCbCr) and the ratio is set to 4:4:4. In this signal format, the pixel clock has a frequency of one-quarter that of the input clock, and divided writing is therefore carried out to four FIFO memories 15-18.

More specifically, the Cb signals are written to FIFO memory 15, the even-numbered Y signals are written to FIFO memory 16, the Cr signals are written to FIFO memory 17, and the odd-numbered Y signals are written to FIFO memory 18.

In 3G-SDI level-A signals (1080p60/50), the frequency of the pixel clock is one-half that of the input clock, and divided write control is therefore implemented to two FIFO memories, as with HD-SDI shown in FIG. 13.

Figure 15:
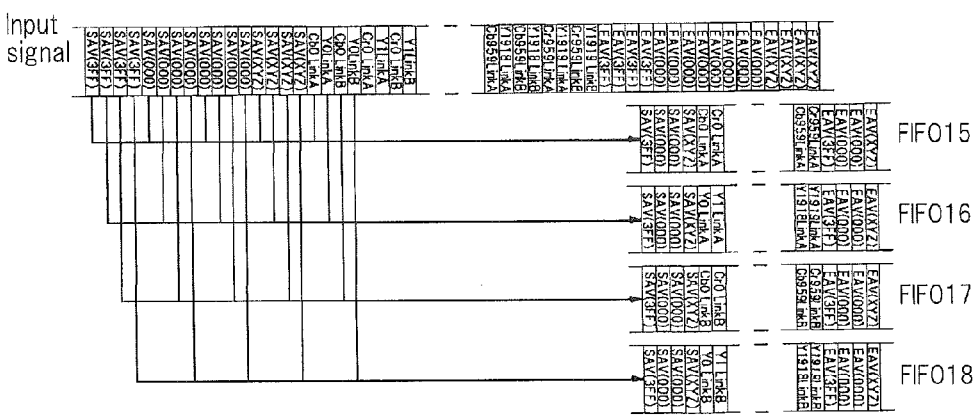
FIG. 15 is a timing chart for describing 3G-SDI data-writing operations that are carried out in the video processing device shown in FIG. 8.

Level B of 3G-SDI is also in four divisions or two divisions as for level A, but the mapping scheme differs. As a result, link-A Cr or Cb signals are written to FIFO memory 15, link-A Y signals are written to FIFO memory 16, link-B Cr or Cb signals are written to FIFO memory 17, and link-B Y signals are written to FIFO memory 18, as shown in FIG. 15.

IN FIFO memories 15-18 in which the above-described write control is executed, the pixel clock from frequency-dividing circuit 14 is supplied as the read clock, whereby the output data of each FIFO memory is converted to the transmission speed of the signal format as shown in the timing charts of FIGS. 10-12.

If the phases of the clocks that are applied as input and frequency-divided clocks can be adjusted in the video processing device of the present exemplary embodiment, save circuits may be used that are made up from flip-flops in place of FIFOs 15-18.

According to the video processing device of the present exemplary embodiment described hereinabove, the unpacking process of output data from descrambler 11 in UNPACK processing circuit 19 is carried out after converting to the speed of the pixel clock of each signal format.

UNPACK processing circuit 19 includes an SD-SDI UNPACK processing circuit, an HD-SDI UNPACK processing circuit, and a 3G-SDI UNPACK processing circuit, and each UNPACK processing circuit carries out the unpacking process in synchronization with the pixel clock from frequency-dividing circuit 14.

The frequency of the pixel clock that is supplied to the SD-SDI UNPACK processing circuit is 13.5 MHz. The frequency of the pixel clock that is supplied to the HD-SDI UNPACK processing circuit is 74.25 MHz. The frequency of the pixel clock that is supplied to the 3G-SDI UNPACK processing circuit is 74.25 MHz or 148.5 MHz.

When UNPACK processing circuit 19 in the above-described case is made up of FPGA, the 3G-SDI UNPACK processing circuit that operates at a pixel clock of 148.5 MHz is made up of FPGA having the highest processing speed, but the processing speed of this FPGA is slower than the processing speed of FPGA used in the video processing device shown in FIG. 2. Through the use of FPGA that has slower processing speed and that is cheaper than that of the video processing device shown in FIG. 2, the cost of the device can be reduced.

Figure 7:
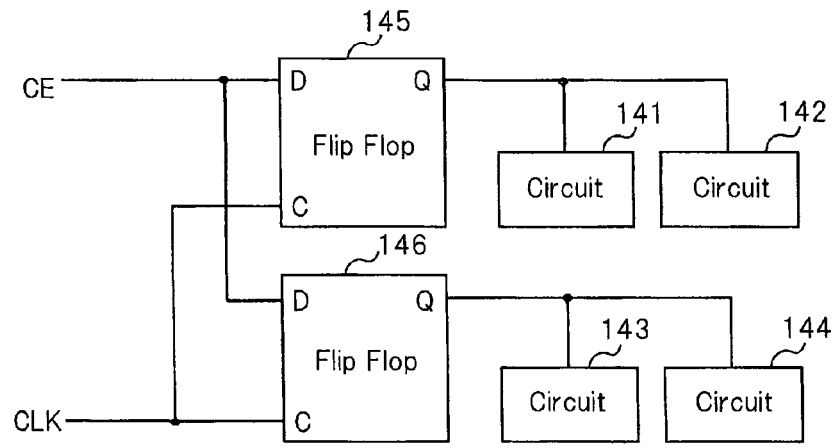
FIG. 7 is a block diagram showing the configuration of another circuit that is applied in the 3G-SDI processing circuits of the video processing device shown in FIG. 2.

In addition, the video processing device of the present exemplary embodiment eliminates the need for the pipeline configuration shown in the lower portion of FIG. 5 or the circuit shown in FIG. 7.

Still further, because there is no need for separately processing level A and level B in 3G-SDI, the effect can be anticipated that increase in circuit scale can be correspondingly controlled. Normally, level B is made up from time-division data of first-set data of Y and C and second-set data of Y and C, whereby, when carrying out the unpacking process by separating the first and second sets of data, a process in which the sampling rate is quartered and a process in which the sampling rate is halved are combined. This case necessitates the use of a rate conversion circuit. However, because UNPACK processing circuit 19 operates at the pixel clock in the video processing device of the present exemplary embodiment, the need for this type of rate conversion circuit is eliminated, and a corresponding reduction of the cost of the device is therefore possible.

Another Exemplary Embodiment

The video processing device of another exemplary embodiment is a video processing device that takes as input any of a plurality of serial digital interface signals that contain signals in which parallel data that contain at least video data have been converted to serial data and information of a clock for establishing synchronization of the parallel data and in which the video format of the video data and a frequency of the clock each mutually differ, the video processing device including:

a deserializer that both converts serial digital interface signals that are received as input to the parallel data and extracts the clock;

format detection means that both detects the video format of the video data that are contained in the parallel data that have been converted by the deserializer and supplies as output clock ratio information that indicates a ratio between a clock frequency and a pixel clock frequency stipulated by the video format that was detected;

pixel clock generation means that, based on the clock that was extracted by the deserializer, generates a pixel clock having the frequency stipulated by the video format that was detected by the format detection means and supplies the generated pixel clock;

saving means that saves the video data that are contained in the parallel data that were converted by the deserializer and that supplies as output the saved video data in synchronization with the pixel clock that was supplied from the pixel clock generation means;

write control means that, based on the clock ratio information that was supplied from the format detection means, divides into two or four portions the video data that are contained in the parallel data that were converted by the deserializer and saves the divided video data in the saving means; and a processor that, synchronized with the pixel clock that was supplied from the pixel clock generation means, subjects data that were supplied from the saving means to processing according to the video format that was detected by the format detection means.

In the above-described video processing device: the saving means may have first to fourth FIFO memories; each of the first to fourth FIFO memories may supply saved video data in synchronization with the pixel clock that is supplied from the pixel clock generation means; and when the clock ratio information is 1:2, the write control means may divide into two portions the video data that are contained in the parallel data that were converted by the deserializer, save one portion of the divided data in the first FIFO memory, and save the other portion of the divided data in the second FIFO memory; and when the clock ratio information is 1:4, the write control means may divide into four portions the video data that are contained in the parallel data that were converted by the deserializer and save the four portions of divided data in respective first to fourth FIFO memories.

Alternatively, in any of the above-described video processing devices, the pixel clock generation means may include: a first frequency-dividing unit that supplies a clock having a frequency of one-half that of the clock that was extracted by the deserializer; a second frequency-dividing unit that supplies a clock having a frequency of one-quarter that of the clock that was extracted by the deserializer; and a selection circuit that takes the outputs of the first and second frequency-dividing units as first and second input, respectively, and based on the video format that was detected by the format detection means, selects and supplies as output either of the first and second inputs.

Still farther, in any of the above-described video processing devices, the plurality of serial digital interface signals may include SD-SDI signals, HD-SDI signals, and 3G-SDI signals.

What is claimed is:

1. A video processing device that takes as input any of a plurality of serial digital interface signals that each contain signals in which parallel data that contain at least video data have been converted to serial data and information of a clock for synchronizing said parallel data and in which the video format of said video data and a frequency of said clock each mutually differ, said device comprising:

a deserializer that both converts serial digital interface signals that are received as input to said parallel data and extracts said clock;

a format detection unit that both detects said video format of said video data that are contained in said parallel data that have been converted by said deserializer and supplies as output clock ratio information that indicates a ratio between a clock frequency and a pixel clock frequency stipulated by the video format that was detected;

a pixel clock generation unit that, based on said clock that was extracted by said deserializer, generates a pixel clock having the frequency stipulated by the video format that was detected by said format detection unit and supplies the generated pixel clock;

a saving unit that saves said video data that are contained in said parallel data that were converted by said deserializer and that supplies as output the saved video data in synchronization with said pixel clock that was supplied from said pixel clock generation unit;

a write control unit that, based on said clock ratio information that was supplied from said format detection unit, divides into two or four portions said video data that are contained in said parallel data that were converted by said deserializer and saves the divided video data in said saving unit; and a processor that, synchronized with said pixel clock that was supplied from said pixel clock generation unit, subjects data that were supplied from said saving unit to processing according to the video format that was detected by said format detection unit.

2. The video processing device as set forth in claim 1, wherein:

said saving unit includes first to fourth FIFO memories;

said first to fourth FIFO memories each supply saved video data in synchronization with said pixel clock that was supplied from said pixel clock generation unit;

when said clock ratio information is 1:2, said write control unit divides into two portions said video data that are contained in said parallel data that were converted by said deserializer and saves one portion of divided data in said first FIFO memory and saves the other portion of divided data in said second FIFO memory; and when said clock ratio information is 1:4, said write control unit divides into four portions said video data that are contained in said parallel data that were converted by said deserializer and saves each of the four portions of divided data in a respective FIFO memory of said first to fourth FIFO memories.

3. The video processing device as set forth in claim 1, wherein said pixel clock generation unit comprises:

a first frequency-dividing unit that supplies a clock having a frequency of one-half that of said clock that was extracted by said deserializer;

a second frequency-dividing unit that supplies a clock having a frequency of one-quarter that of said clock that was extracted by said deserializer; and a selection circuit that takes the output of said first and second frequency-dividing units as first and second inputs, respectively, and, based on the video format that was detected by said format detection unit, selects and supplies as output one of said first and second inputs.

4. The video processing device as set forth in claim 1, wherein said plurality of serial digital interface signals includes SD-SDI signals, HD-SDI signals, and 3G-SDI signals.

5. A video processing method comprising:

taking as input any of a plurality of serial digital interface signals that each contain a signal in which parallel data that contain at least video data are converted to serial data and information of a clock for synchronizing said parallel data and for which the video format of said video data and a frequency of said clock mutually differ; and both converting the serial digital interface signals that were received as input to said parallel data and extracting said clock;

both detecting said video format of said video data that are contained in said parallel data that were converted and generating clock ratio information that indicates a ratio between a clock frequency and a pixel clock frequency stipulated by the video format that was detected;

based on said clock that was extracted, generating a pixel clock having the frequency that was stipulated by the video format that was detected;

based on said clock ratio information, dividing into two or four portions said video data that are contained in said parallel data that were converted and saving the divided video data in memory, and then supplying as output video data that were saved in memory in synchronization with said pixel clock; and synchronized with said pixel clock, subjecting data that were supplied from said memory to processing that accords with said video format that was detected.

* * * * *